United States Patent
Margetson et al.

(10) Patent No.: US 12,059,999 B2
(45) Date of Patent: Aug. 13, 2024

(54) DISPLAY SYSTEM

(71) Applicants: Guy Margetson, Sussex (GB); LIGHTZ LIMITED, Hertfordshire (GB)

(72) Inventors: Guy Margetson, Sussex (CN); Michael Beadman, Cambridgeshire (GB); Ben Crundwell, Cambridgeshire (GB)

( * ) Notice: Subject to any disclaimer, the term of this patent is extended or adjusted under 35 U.S.C. 154(b) by 142 days.

(21) Appl. No.: 17/770,644

(22) PCT Filed: Oct. 23, 2020

(86) PCT No.: PCT/IB2020/059967
§ 371 (c)(1),
(2) Date: Apr. 21, 2022

(87) PCT Pub. No.: WO2021/079327
PCT Pub. Date: Apr. 29, 2021

(65) Prior Publication Data
US 2022/0396201 A1    Dec. 15, 2022

(30) Foreign Application Priority Data

Oct. 23, 2019  (GB) ...................................... 1915356
Nov. 8, 2019   (GB) ...................................... 1916314
Oct. 22, 2020  (GB) ...................................... 2016784

(51) Int. Cl.
*B60Q 1/50*    (2006.01)
*B60K 35/00*   (2024.01)
(Continued)

(52) U.S. Cl.
CPC ............ *B60Q 1/5037* (2022.05); *B60K 35/00* (2013.01); *B60Q 1/326* (2013.01);
(Continued)

(58) Field of Classification Search
CPC .. B60Q 1/5037; B60Q 1/326; B60Q 2900/30; B60K 35/00; B60K 2370/332;
(Continued)

(56) References Cited

U.S. PATENT DOCUMENTS 10,783,559 B1 *  9/2020  Tran .................. G06Q 30/0266
2006/0239018 A1 * 10/2006 Jardin ....................... B60Q 1/50
                                                              362/459
(Continued)

FOREIGN PATENT DOCUMENTS

CN        108962108 A  * 12/2018  ........... G09F 21/045
WO   WO-2015051625 A1 *  4/2015  ........... G06T 3/4007
(Continued)

*Primary Examiner* — Dramos Kalapodas
(74) *Attorney, Agent, or Firm* — Jose Cherson Weissbrot

(57) ABSTRACT

A display system for at least one wheel of at least one vehicle comprising:
At least one LED display device for displaying information on a wheel of a vehicle;
A computer in association with the at least one LED display device, the computer comprising GPS;
A main server;
Wherein the LED display device is linked to the computer and the computer is in wireless communication with the main server via a wireless network; in use, the server has stored in memory a plurality of information packets for display by the LED display device, each information packet has an associated location and/or time for being displayed, the main server wirelessly sends at least one information packet and associated time and/or location to the associated computer of the at least one vehicle, when the at least one vehicle is in the desired location and/or time the computer instructs the at least one LED display device to display the associated information.

12 Claims, 3 Drawing Sheets

(51) Int. Cl.
  *B60Q 1/32* (2006.01)
  *G06Q 30/0251* (2023.01)
  *B60K 35/60* (2024.01)
  *B60K 35/81* (2024.01)
  *B60K 35/85* (2024.01)
  *G09F 9/33* (2006.01)
  *G09F 21/04* (2006.01)

(52) U.S. Cl.
  CPC .......... *G06Q 30/0266* (2013.01); *B60K 35/60* (2024.01); *B60K 35/81* (2024.01); *B60K 35/85* (2024.01); *B60K 2360/332* (2024.01); *B60K 2360/338* (2024.01); *B60K 2360/589* (2024.01); *B60K 2360/797* (2024.01); *B60Q 2900/30* (2013.01); *G09F 9/33* (2013.01); *G09F 21/045* (2013.01)

(58) Field of Classification Search
  CPC .......... B60K 2370/338; B60K 2370/52; B60K 2370/589; B60K 2370/797; B60K 2370/152; B60K 2370/47; B60K 2370/573; B60K 2370/5911; B60K 2370/592; G06Q 30/0266; G09F 9/33; G09F 21/045
  See application file for complete search history.

(56) References Cited

U.S. PATENT DOCUMENTS

| | | | |
|---|---|---|---|
| 2016/0000951 A1* | 1/2016 | Kreiner | A61L 2/0047 |
| | | | 250/492.1 |
| 2018/0134208 A1* | 5/2018 | Fisher | B60R 16/033 |
| 2021/0035160 A1* | 2/2021 | Xu | G06Q 30/0265 |

FOREIGN PATENT DOCUMENTS

| | | | | |
|---|---|---|---|---|
| WO | 2016181134 A1 | 11/2016 | | |
| WO | WO-2016181134 A1 * | 11/2016 | ............. | G09G 3/005 |

* cited by examiner

DISPLAY SYSTEM

The present invention relates to display systems, in particular it relates to systems for electronically displaying information on the wheel of a vehicle. Even more particularly the invention relates to a system for remotely controlling an LED display on the hub of a wheel of a vehicle.

BACKGROUND OF THE INVENTION

Wheel mounted visual display systems are generally known. WO2016181134 A1 discloses an LED display device (hereafter referred to as "LED device") for mounting to the hub of a wheel of a vehicle and is incorporated herein by reference in its entirety. For the sake of clarity and conciseness complete discussion of the technical details of the LED device is not made.

There are a number of drawbacks to the LED device disclosed in WO2016181134. Firstly, the information to be displayed by the LED device is stored on an internal memory of the LED device before installation of the LED device on a wheel. Therefore, the display settings are substantially fixed until the internal memory can be accessed and changed, which cannot be done while the vehicle is moving.

Secondly, the LED device is powered using batteries. This means the LED device will eventually run out of power and the batteries will need to be replaced or recharged and there will be times when the LED device is non operable.

Thirdly, the LED device of WO2016181134 A1 does not reach substantially the centre of the wheel it is mounted to. This means there is wasted potential display space. It also isn't attachable to all types of vehicle wheel/has to be bespoke for each wheel type.

It is an object of the current invention to provide a display system for the wheel of a vehicle which addresses at least one of the drawbacks discussed of the LED device disclosed in WO2016181134.

STATEMENT OF INVENTION

A display system for at least one wheel of at least one vehicle comprising: At least one LED display device for displaying information on a wheel of a vehicle;
A computer in association with the at least one LED display device, the computer comprising GPS;
A main server;
Wherein the LED display device is linked to the computer and the computer is in wireless communication with the main server via a wireless network; in use, the server has stored in memory a plurality of information packets for display by the LED display device, each information packet has an associated location and/or time for being displayed, the main server wirelessly sends at least one information packet and associated time and/or location to the associated computer of the at least one vehicle, when the at least one vehicle is in the desired location and/or time the computer instructs the at least one LED display device to display the associated information.

An embodiment of the invention wherein the main server transfers a plurality of information packets and their associated location/time to the computer in one go, the computer sending an appropriate information packet to the at least one LED display device when the at least one vehicle is in the associated location and/or time.

An embodiment of the invention wherein the computer associated with the at least one vehicle continuously informs the main server of the at least one vehicles location, when the vehicle is in a location and/or time corresponding to an information packet stored by the main server, it sends the corresponding information packet to the computer which then in turn instructs the LED device to display the information.

An embodiment of the invention wherein the at least one vehicle has a plurality of LED display devices associated therewith, each LED display device associated to a respective wheel of the at least one vehicle.

An embodiment of the invention wherein each of the plurality of LED display devices can be instructed by the computer to display different information packets, such that each wheel of the at least one vehicle with an LED display device associated therewith can display a different information packet.

An embodiment of the invention wherein there are a plurality of vehicles each with an associated computer, wherein each associated computer is in communication with the main server.

An embodiment of the invention wherein the associated computer is integral with the at least one vehicle.

An embodiment of the invention wherein the associated at least one computer is integral with the at least one LED display device.

An embodiment of the invention wherein the associated computer is in the form of a portable smart device (a mobile phone, tablet etc).

An embodiment of the invention wherein the associated computer is linked wirelessly to the at least one LED display device via near field communication.

An embodiment of the invention wherein between the computer and the main server connection there is a local data management system (DMS), in use the DMS is connected to the main server and manages a specific geographical area, the main server transfers all information packets associated to that specific geographical area to the DMS, the DMS then communicates the information packets to the associated computers in the specific geographical location.

An embodiment of the invention wherein the information to be displayed is in the form of pictures and/or words.

BRIEF DESCRIPTION OF THE DRAWINGS

The invention will be described in more detail, by way of example, with reference to the following drawings.

DETAILED DESCRIPTION

The present application adapts the technology presented in the inventor's previous patent application, WO2016181134A1, which is incorporated herein by reference in its entirety.

The display system of the present invention utilises a LED display device which operates substantially in the same manner as the LED device disclosed in WO2016181134A1, the LED device further comprises wireless communication means such as BlueTooth®, 3G-5G, WiFi, or any other suitable wireless communication means known to a person skilled in the art. The display system further comprising a computer linked to the LED device, the computer having access to a wireless data network.

Figure 1:
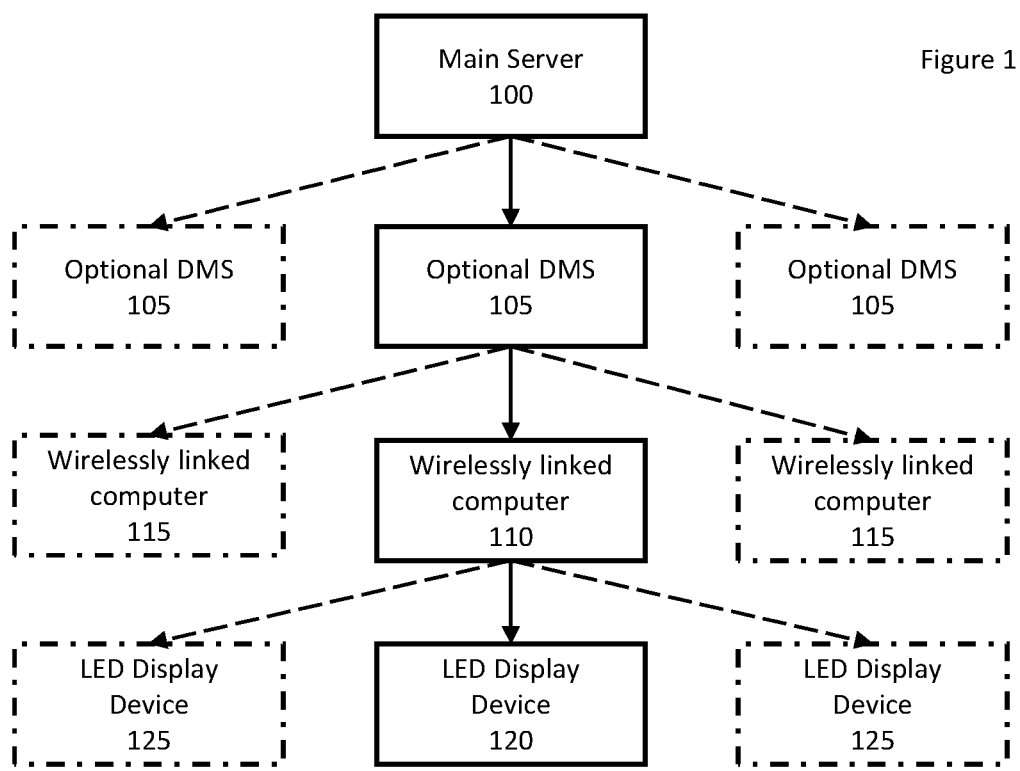
FIG. 1 depicts the wireless connection arrangement of an embodiment of the invention.

With reference to FIG. 1, in a preferred embodiment of the present display system there is at least one LED device 120 secured to at least one wheel of a vehicle. The at least one LED device 120 is coupled to a computer 110 associated with the vehicle, the computer is linked to a central server 100 via a wireless network. The computer also has a GPS.

The at least one computer 110,115 receives information from a central control server 100, over a wireless or mobile data network such as WiFi, 3G, 4G or other wireless data sources known to the skilled person. The information received from the central control server 100 triggers a 'push notification' on the computer 110, which in turn is sent to the at least one LED device 120,125, which causes the at least one LED 120,125 device on the at least one wheel to display an image according to the data provided from the central control server 100. The computer 110 and the at least one LED device 120 are in communication, by a local wireless network such as BlueTooth® or through physical connection. It is by means of this connection that said display instructions are transmitted from the computer to the at least one LED device.

The information transmitted by the central control server may depend on, for example, the location of the computer and therefore vehicle, and/or the time of day. The computer may be in constant communication with the control server, receiving updated commands based on the time and/or the computer's location. Alternatively the computer may receive a bulk of information from the control server in a single download, this information is then stored by the computer/LED device. The display settings of the LED device controlled by the time and/or location, and the stored information. In the former set up the display system continues to operate even when connection between the computer and the control server is lost.

In general, the invention relates to a smart vehicle display system which illuminates a predetermined messages/advertisements on at least one wheel of at least one vehicle, the predetermined message/advertisement being chosen based on the time and/or the location of the respective at least one vehicle.

There is a main server which communicates to a computer associated to a respective at least one vehicle via a wireless communication network such as 3G/4G/5G, or any other suitable wireless communication network known to the skilled person. The computer communicates with at least one LED device located on at least one wheel of the at least one vehicle via BlueTooth® or any suitable short range wireless communication means known to a person skilled in the art.

The main server would receive images/messages and the desired time/location for them to be displayed from a user in a defined format. The user can be anyone; a private individual, a company, an agency, a city council etc.

The main server then converts the provided images/messages into "display data files". The main server then can either send the display data files to the computer associated to the at least one vehicle dependent on the time and location of the at least one vehicle. Or, the main server can tag the "display data files" with the users desired time and location. The main server then transfers a number of images/messages and their associated times and locations to the computer associated to its respective at least one vehicle.

If the main server is sending the "display data files" to the computer when the computer is at the desired time and/or location. The computer receives the "display data file" and sends it to the at least one LED device on the at least one wheel of the vehicle via short range wireless communication.

If the main server is sending a plurality of "display data files" with their respective times/locations in one go to the computer associated to its respective at least one vehicle. The computer stores the plurality of "display data files" and their respective time/location tags, once at an appropriate time/location e/location the computer sends the associated "display data file" to the at least one LED device to be displayed.

Once no longer in the associated time/location e/location the LED device stops displaying the associated image/message. If more than one wheel of the vehicle has an associated LED device, different images/messages can be sent to each wheel.

The computer calculates how many seconds each image/message has been displayed and communicates this information back to the main server. The main server then logs which images/messages got what number of seconds of display each hour/day/week/month.

The current invention can have one computer linked to multiple LED systems (for different wheels of the vehicle) each of which can display a different image/message. Multiple computers and respective vehicles can be linked to a single main server.

Alternatively, in the current invention each LED device can have its own associated computer integrally formed with the LED device. Each computer in wireless communication with the single main server.

Between the main server and the computer there can be a local Data Management System (DMS) 105. The DMS 105 is associated with a particular area, for example a particular city or a racetrack etc. A user would upload a plurality of images/messages to the main server 100 which would convert the images/messages into "display data files". The "display data files" would then be sent to the local DMS 105 chosen by the user. At the DMS the data packets are tagged with time/location to be displayed and from there sent to the at least one computer 110,115 associated with the at least one vehicle.

Figure 2:
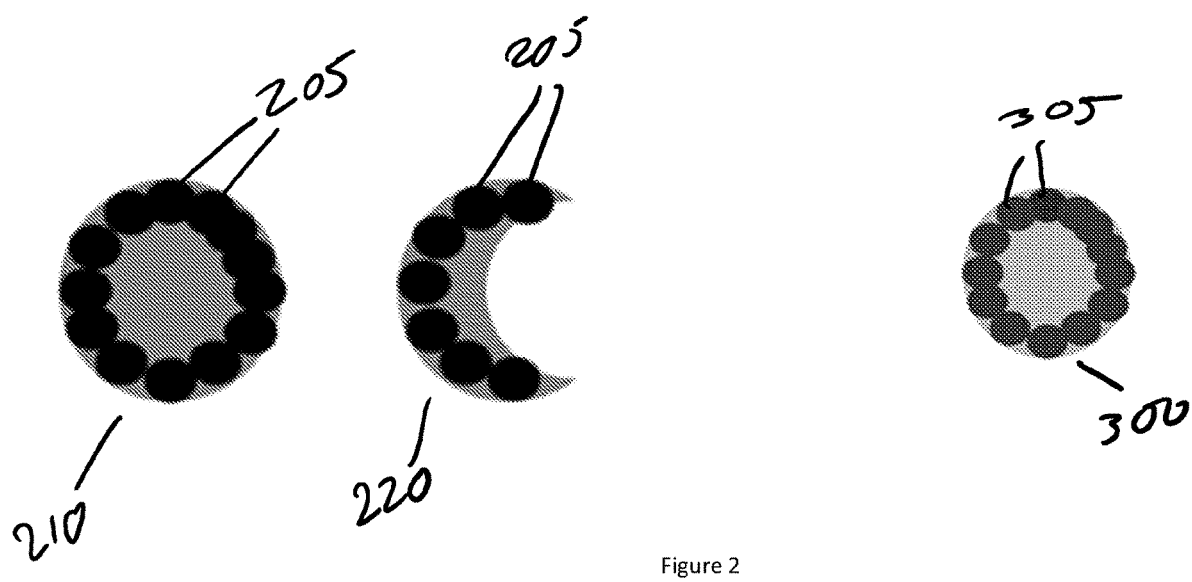
FIG. 2 depicts a schematic of optional charging discs.
Figure 3:
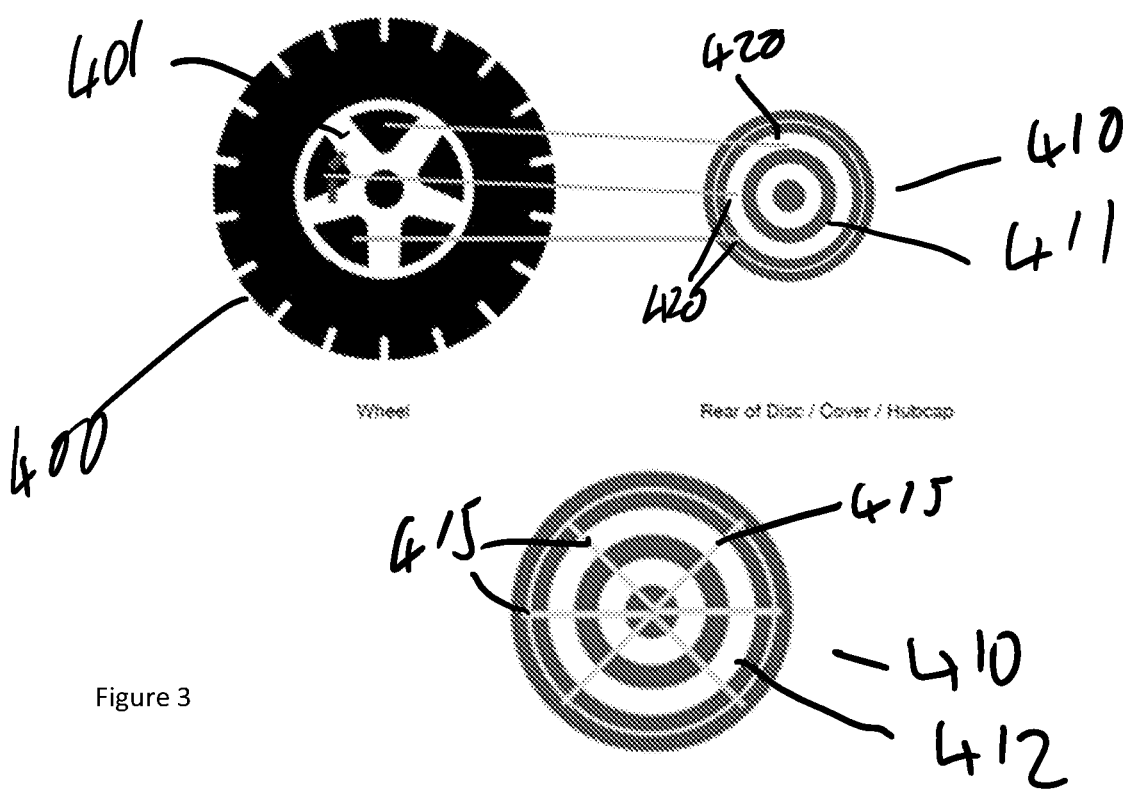
FIG. 3 depicts a schematic of a charging pad.

The LED device of the display system of the current invention can further comprise annular charging pads 300 coated in at least one conductive coil(s) 305 for installation at the back (inner side of the wheel opposing the outward facing side the LED device is mounted to) of the wheels. A power cable from a power cell in the vehicle, such as the battery of an electric or hybrid electric vehicle (EV, HEV), is provided to at least one vehicle wheel hub. A charge attachment similar in shape and size to a brake caliper is provided at the at least one wheel. The charge attachment is solid and non-moving in relation to the movement of the wheel. This holds a second annular charging disc 210,220, which may be a partial ring (such as 220 in FIG. 2) according to spatial requirements. These charging rings are connected to respective said power cables from the power cell and, in use, provide power to the annular charging pads 300 provided at each wheel.

In more specific detail, the battery within each of the at least one vehicle is connected to cable(s) which run from the battery to each/all of the four hubs and connects to the charging disc 210/220 of the charging attachment in the at least one wheel hub. Attached like a second/dual caliper, the charge disc 210/220 can be mounted around the disc brake and in front of the disc brake, proud and separated by millimetres.

The charge disc is 360 degrees circular where possible (210), or anywhere between 180 degrees and 360 degrees (220) if there is not enough space between the real brake caliper and the back of the wheel.

All over the charge disc are circular coils 205 for charging the corresponding receiving circular coils 305 of the annular charging pad 300 in the at least one wheel. Where possible either could be resonating to increase the power generated.

Mounted on the outward facing (front side) of the at least one wheel is the LED device comprising LEDs, printed circuit boards (PCBs), Accelerometers, Hall Effect sensors, Memory Chips, FPGAs etc to display messages, logos and any shapes, pictures, city information like congestion, emergency messages as desired by the user. Driven by an App in the Computer that downloads data from the main server and transfers it to the at least one LED device in and instructs the at least one LED device to illuminate the desired display for that time (each second) of that day and by the GPS location.

Behind the wheel, but still attached within the wheel, is the annular charging pad 300 coated with at least one circular coil 305. The at least one coil(s) 305 on the charging pad 300 can be resonating with the at least one coil(s) 205 of the charging disc 210/220 where desired.

Alternatively, the LED device attachment may include an annular charging pad 300 with a set of one or more coil(s) 305 to interact with a set of one or more magnets (magnetic coils etc.) on a portion of the wheel assembly which is stationary relative to the rotating wheel. The magnets may be permanent magnetic or electromagnets. In this way the coils may form part of the rotor of a generator to generate power for the LED device, the coils comprising the stator of the generator. Power from the coils may be stored on device, for example in a rechargeable battery or supercapacitor.

When the wheel slows or stops the coils of the charge pad may be driven so that the charge pad then becomes the rotor of a motor, the stator of which is defined by magnets. In this way an image may be displayed or maintained when the vehicle is stationary. In a variant of the above described implementation, when the vehicle is slow or stopped the LED device may be driven to rotate by driving coils of the charge disc to act on coils of the charge pad (in this instance acting as the magnets), for example driving the coils of the charge disc with a rotating magnetic field to drive rotation of the LED device. Doing this would require use of a one way clutch, for example a sprag clutch, or other known suitable one way clutches can be used.

Alternatively to the LED device disclosed in WO2016181134. The LED device of the current display system may be in the form substantially of a disc 410 for attachment to the at least one wheel 400 like a hubcap/cover of the at least one wheel 400, rather than the LED device being attached between the spokes of the at least one wheel.

As best shown in FIG. 4, prongs 420 extending away from the back 411 of the LED device disc 410 to between spokes 401 of wheel 400 are used for attachment to the spokes of wheel for strength/robust/accurate positioning, this may be assisted by additional complimentary attachment means 402 located on the spokes 401 of the wheel 400. On the front 412 outer facing side of the LED device disc 410, there are LED strips 415 which run from the outer edge/rim of disc 410 to substantially the centre. In certain cases, the centre of the wheel will be the wheel nut attachment so the LEDs extend as close to the centre as possible. Also, on the rear of LED device disc are located the rechargeable power packs (not shown), these may be self charging from the rotary inertia as discussed above, or powered by connection to a power cell of the at least one vehicle as discussed further above.

The LED device disc can be attached to nearly any wheel and enables the display to reach substantially the centre of the wheel.

LEDs PCBs are built into the LED device disc, preferably multiple strips of LEDs extending from a point on the rim of the LED device disc to substantially the centre of the LED device disc. Hall effect sensors prong from rear of disc thru some/all gaps between spokes of the wheel the LED device disc is attached to. The hall effect sensors are used by the LED device to track its relative rotational position in relation to the stationary magnet(s) (magnetic coils) of the charge disc. Alternatively an accelerometer could be used to identify when gravity is at a maximum in one axis of the plane defined by the LED device disc. Therefore using the accelerometer would enable the LED device to identify top centre/bottom centre positions and from this to track its relative rotational position. If incorporated also with a gyroscope this could also remove the effects of the changes in angle to improve accuracy. The advantage of this construction is that there is no longer the requirement to have a fixed reference/magnet on the vehicle for the LED device to measure its orientation.

The invention has been described with reference to a preferred embodiment. The description is intended to enable a skilled person to make the invention, not to limit the scope of the invention. The scope of the invention is determined by the claims.

The invention claimed is:

1. A display system for a wheel of vehicle comprising:
   an LED display device for displaying information and suitable for attachment to an outer face of the wheel of the vehicle;
   an inductive charging pad suitable for attachment to an inner face of the wheel the charging pad being electrically coupled to the LED display device;
      an inductive charging disc comprising at least one inductive charging coil, suitable for mounting to the vehicle proximate the inner face of the wheel of the vehicle,
   the charging disc being electrically coupl-able to a vehicle battery so that the at least one of the inductive charging coil can receive an electrical power from the vehicle battery:
      a computer in association with the LED display device, the computer comprising GPS;
   a main server;
      wherein the LED display device is linked to the computer and the computer is in wireless communication with the main server via a wireless network;
   and wherein in use;
      the main server has stored in memory a plurality of information packets for display by the LED display device;
      each information packet of the plurality of the information packets has an associated location and/or time for being displayed;
      the main server wirelessly sends at least one information packet of the plurality of the information packet and associated time and/or location to the associated computer; and
      when the vehicle is in the associated location and/or time, the computer instructs the at LED display device to display the associated information packet of the plurality of information packets.

2. The display system according to claim 1, wherein the main server transfers the plurality of information packets and their associated location/time to the computer in one go, the computer sending an appropriate information packet of the plurality of information packets to the LED display device when the vehicle is in the associated location and/or time.

3. The display system according to claim 1, wherein the computer associated with the vehicle continuously informs the main server of the vehicles location, when the vehicle is in a location and/or time corresponding to an information packet of the plurality of information packets, stored by the main server, it sends the corresponding information packet of the plurality of information packets to the computer which then in turn instructs the LED device to display the information.

4. The display system according to claim 1, wherein the vehicle has a plurality of LED display devices associated therewith, each LED display device associated to a respective wheel of the vehicle.

5. The display system according to claim 4, wherein each of the plurality of LED display devices are instructed by the associated computer to display different information packets, such that each wheel of the vehicle with the LED display device associated therewith can display a different information packet.

6. The display system according to claim 1, wherein there are a plurality of vehicles each with the associated computer, wherein each associated computer is in communication with the main server.

7. The display system according to claim 1, wherein the associated computer is integral with the vehicle.

8. The display system according to claim 1, wherein the computer is integral with the LED display device.

9. The display system according to claim 1, wherein the associated computer is in the form of a portable smart device.

10. The display system according to claim 7, wherein the associated computer is linked wirelessly to the LED display device via near field communication.

11. The display system according to claim 1, wherein between the computer and the main server connection there is a local data management system (DMS), in use the DMS is connected to the main server and manages a specific geographical area, the main server transfers a plurality of information packets associated to that specific geographical area to the DMS, the DMS then communicates the plurality of information packets to the associated computers in the specific geographical location.

12. The display system according to claim 1, wherein an information to be displayed is in the form of pictures and/or words.

* * * * *